United States Patent [19]

Miller et al.

[11] 4,379,534
[45] Apr. 12, 1983

[54] CARGO LIFT SYSTEM

[75] Inventors: Ralph A. Miller, Monmouth Beach, N.J.; Randall F. White, Paradise, Calif.

[73] Assignee: The United States of America as represented by the Secretary of the Navy, Washington, D.C.

[21] Appl. No.: 239,305

[22] Filed: Mar. 2, 1981

[51] Int. Cl.³ ........................ B64D 1/08; B64D 17/72
[52] U.S. Cl. ........................ 244/137 R; 244/138 R; 244/146; 244/147; 367/3; 102/354; 102/387; 441/1; 441/30; 441/33
[58] Field of Search ............ 244/137 R, 138, 146, 244/147, 1 R, 148, 149, DIG. 2; 441/1, 11, 2, 30, 6, 31, 7, 32, 33; 367/3, 4; 102/387, 337, 348, 354

[56] References Cited

U.S. PATENT DOCUMENTS

| 1,260,474 | 3/1918 | Stevens ........................... 244/147 |
| 1,755,954 | 4/1930 | Guede et al. .................... 244/147 |
| 1,840,618 | 1/1932 | Castner .......................... 244/146 |
| 2,377,587 | 6/1945 | Strong ............................ 102/387 |
| 3,341,871 | 9/1967 | Oliveau .......................... 441/30 |
| 3,389,880 | 6/1968 | Ferguson ........................ 244/137 R |
| 3,514,058 | 5/1970 | Sloan, Jr. et al. ............... 244/138 |
| 3,840,057 | 10/1974 | Lesh, Jr. ........................ 244/DIG. 2 |
| 3,860,984 | 1/1975 | Fisher ............................ 244/DIG. 2 |
| 3,891,165 | 6/1975 | Day et al. ...................... 244/137 R |
| 4,048,942 | 9/1977 | Cotton et al. .................. 244/138 R |
| 4,298,963 | 11/1981 | Dejob et al. .................... 244/138 R |

FOREIGN PATENT DOCUMENTS 890178 2/1962 United Kingdom ........... 244/137 R

Primary Examiner—Galen L. Barefoot
Attorney, Agent, or Firm—R. S. Sciascia; Henry Hansen

[57] ABSTRACT

A system for transferring cargo at sea by helicopter includes an automatically activated self inflatable apparatus for reducing the velocity of the cargo if jettisoned or inadvertently dropped into the sea and for keeping the cargo afloat until retrieval may be accomplished. The cargo is lifted by a support sling attachable to a helicopter suspension cargo hook and simultaneously connected to a second sling in parallel to the helicopter through the rapidly deployable retardation and floatation device. Release of the support sling causes the cargo to drop and initiate deployment and inflation of the ribs of the parachute thereby retarding the cargo's descent and providing buoyancy for its floatation.

5 Claims, 8 Drawing Figures

U.S. Patent   Apr. 12, 1983   Sheet 1 of 3   4,379,534
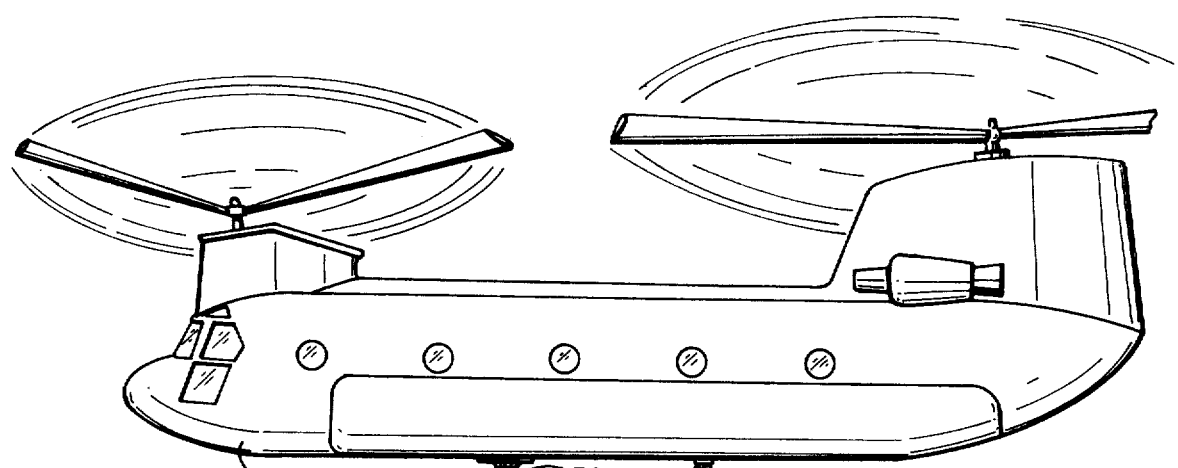
FIG. 1
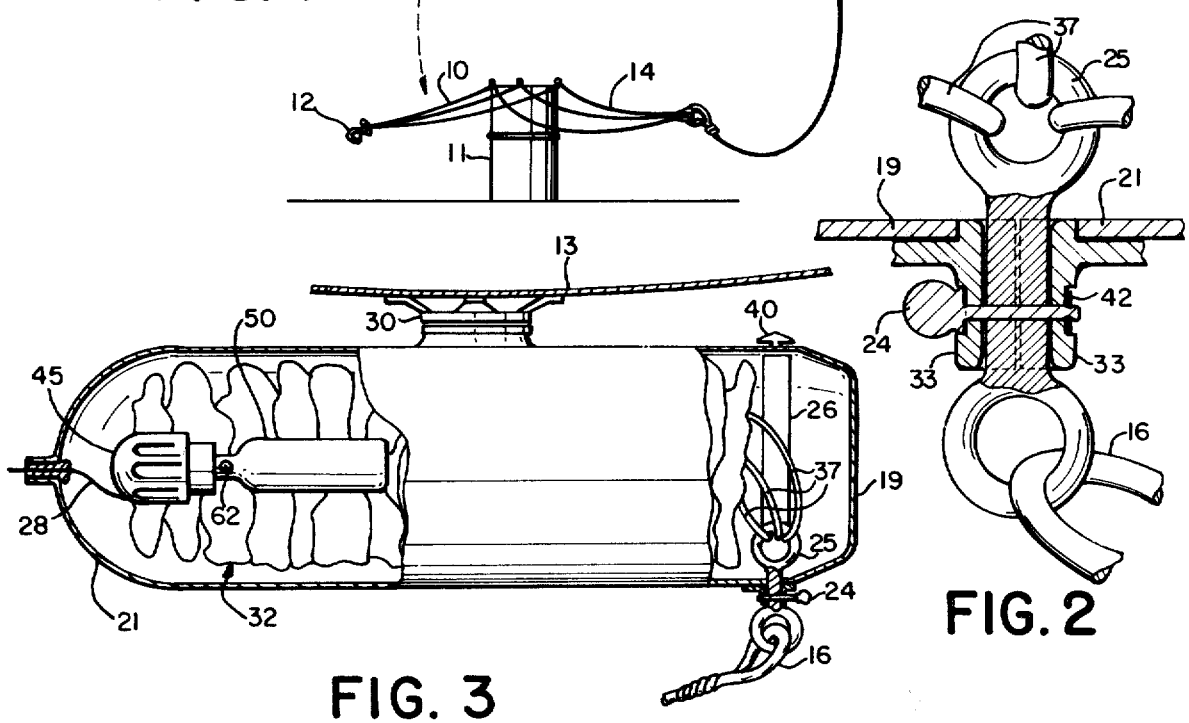
FIG. 2
FIG. 3

CARGO LIFT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to recovery devices and more particularly to a system for a rapidly deployable combined retardation and floatation system for recovery of jettisoned or inadvertently dropped cargo.

The use of helicopters for transporting supplies from one ship to another occurs regularly on a daily basis and is considered a common occurrence. On occasions a transitioning cargo is deliberately or inadvertently dropped during the replenishment operation. Without the utilization of a retardation device, the cargo's terminal velocity upon impact with the water surface is sufficient to cause severe damage making the cargo unable to serve the intended purpose. Additionally, after impact the cargo lacking buoyancy sinks to the bottom of the water and is normally unsalvageable. The cost of repair being excessive or replacement not capable of being done easily or conveniently compels the transporter under the circumstances to provide a safer technique to insure against the damage or loss of the cargo.

SUMMARY OF THE INVENTION

Accordingly, the general purpose and object of this invention is to provide a system for recovery of helicopter transported externally slung cargo which is jettisoned or inadvertently dropped during inter-ship replenishment operations. Another object is to provide a self-contained gas inflatable parachute which functions as a retardation and floatation device. Still another object is to provide a cargo recovery system for attachment to a helicopter. Yet another object is to provide a recovery system which is independently coupled to the cargo. It is a further object of the invention to provide a cargo recovery system which is automatically initiated by an increase in relative distance between the cargo and the helicopter. It is still another object to provide a cargo recovery system which goes to full deployment and inflation in approximately one and a half seconds.

Briefly, these and other objects of the present invention are accomplished by utilizing a single element having an inflatable substructure which functions in a dual mode as a combination retardation and floatation system.

Other objects, advantages and novel features of the invention will become apparent from the following detailed description of the invention when considered in conjunction with the accompanying drawings wherein;

BRIEF DESCRIPTION OF THE DRAWINGS

FIG. 1 is a representation of a helicopter with a retardation and floatation system according to the invention connected to the underside of the fuselage prior to connection to a cargo;

FIG. 2 is an enlarged cutaway view of a container of the system of FIG. 1 mounted on the underside of the helicopter fuselage;

FIG. 3 is an enlarged view of a door release mechanism of the container of FIG. 2;

DESCRIPTION OF THE PREFERRED EMBODIMENT

Figure 4:
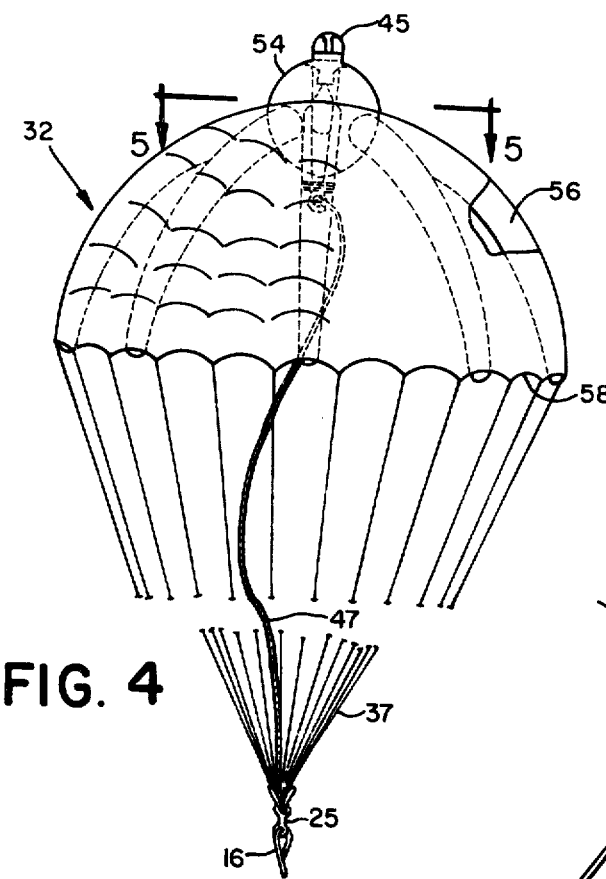
FIG. 4 is a retardation and floatation device of the system of FIG. 1 in an inflated condition.

Referring now to the drawings, wherein like reference characters designate like or corresponding parts throughout the several views, there is illustrated in FIG. 1, a helicopter 13 having connected to the underside of its fuselage by means of a swivel attachment 30 a retardation and floatation device container 21 configured as a cylindrical shape approximately 13 inches in diameter and 45 inches long with streamlined ends.

Container 21, more clearly illustrated in FIG. 2, is fabricated as a fiberglass reinforced laminate having a wall thickness of approximately 1/10 of an inch. Swivel attachment 30 permits container 21 to pivot freely a full 360° about a vertical axis and will orient, in the direction of exerted pull to facilitate withdrawal of an inflatable retardation and floatation device 32 stored in container 21 under all directions of flight. At one end of container 21 is a door 19 having a hinge 40. Door 19 is held in the closed position by a latch release pin 24 held in position by a retainer ring 42, when the device 32 is in the stowed condition and when not activated for deployment. Door 19 can be opened to permit device 32 to be withdrawn. As shown in FIGS. 3 and 4 shroud lines 37 connected at one end to a shroud to pendant transition connector 25 comprising a rod with an eyelet on each end. Lines 37 are attached to the top eyelet and a retardation and floatation device pendant 16 is attached to the bottom eyelet. Connector 25 is held in position between two halves of a ferrule 33. One half of ferrule 33 is connected to door 19 and the other half is connected to container 21. Both ferrule 33 and connector 25 have a hole through their diameter each of which is aligned with the other and through which is inserted the latch release pin 24 which is held in position by the retaining ring 42. Referring back to FIG. 1, pendant 16 connected to the bottom eyelet of fitting 25 has a reach tube 15 at its distal end which is securely affixed to a pendant retention latch 22. A reefed section 23 of pendant 16 consisting of approximately 6 feet of pendant wrapped and held by safety ties 35 is located adjacent to the bottom of connector 25. In order to perform a lifting operation, a cargo support bridle 14 is connected on one end to a cargo support sling 17 and on the other end to a cargo 11. A reach tube 18 at the distal end of sling 17 is connected to a helicopter cargo suspension hook 20. To implement the retardation and floatation system (RAFT), a retardation and floatation device bridle 10 is attached in parallel with bridle 14 to the cargo 11. The other end of bridle 10 is terminated with an automatic closing bridle cargo hook 12 which is connected to the distal end of pendant 16 or reach tube 15. When a cargo 11 falls free for whatever reason from helicopter 13, tension on the reefed section 23 of pendant 16 breaks loose its safety ties 35 and extends for approximately 6 feet. Subsequent to the full extension, pin 24 is sheared when the weight of cargo 11 is transferred to parachute shroud line-to-pendant connector 25. Subsequent to shearing of pin 24, door 19 of container 21 swings open and the device 32 is withdrawn from container 21. The container and door are fitted with a weathertight gasket seal 26 in order to preserve watertight integrity. One end of a lanyard 28 is securely fastened to the inside of container 21 and is tensioned by withdrawal of device 32 thereby initiating inflation of device 32.

Figure 5:
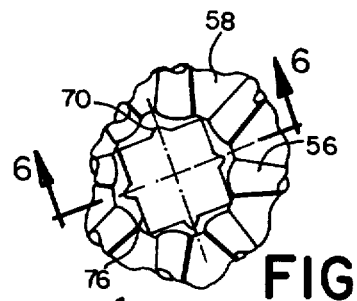
FIG. 5 is a cross-sectional view of a portion of the device of FIG. 4 along the line 5—5 thereof.
Figure 6:
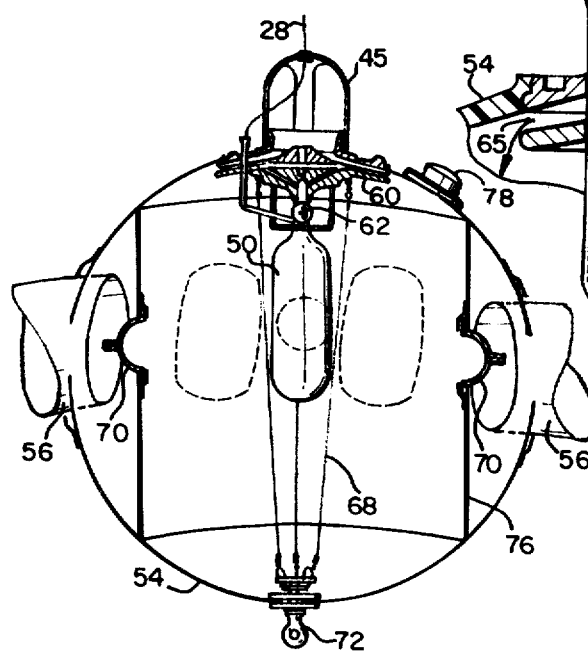
FIG. 6 is an enlarged cross-sectional view of the portion of FIG. 5 along the line 6—6 thereof.

Referring to FIG. 4, device 32 includes an elastomer-coated single-ply canopy 58, approximately 15 feet in diameter, having a substructure with eight equally spaced, radial inflatable ribs 56 centered about an inflatable sphere 54 protected against puncture by a layer of heavier, two-ply coated fabric. Shroud lines 37 connect canopy 58 to the connecter 25. Referring to FIGS. 5 and 6, four internal bulkheads 76 are located within the sphere 54 and sealed along their edges to the sphere 54 such that the ribs 56 are separated in pairs to provide four independant air-tight compartments. A fifth air-tight compartment is formed as the core volume of the sphere by the bulkheads 76 enclosing inflation subsystems 50, 60 and 62. All five compartment volumes are equal. Each bulkhead 76, contains an elastomer duckbill-type low pressure relief valve 70 to permit all chambers to be inflated by the centrally located inflation subsystems comprising an aspirator 60, a ball type valve 62 and a high pressure stored gas reservoir 50. Thus, if any one of the compartments are punctured, a buoyancy will be retained that exceeds the total weight of the maximum cargo 11, and retardation and floatation device 32.

Figure 7:
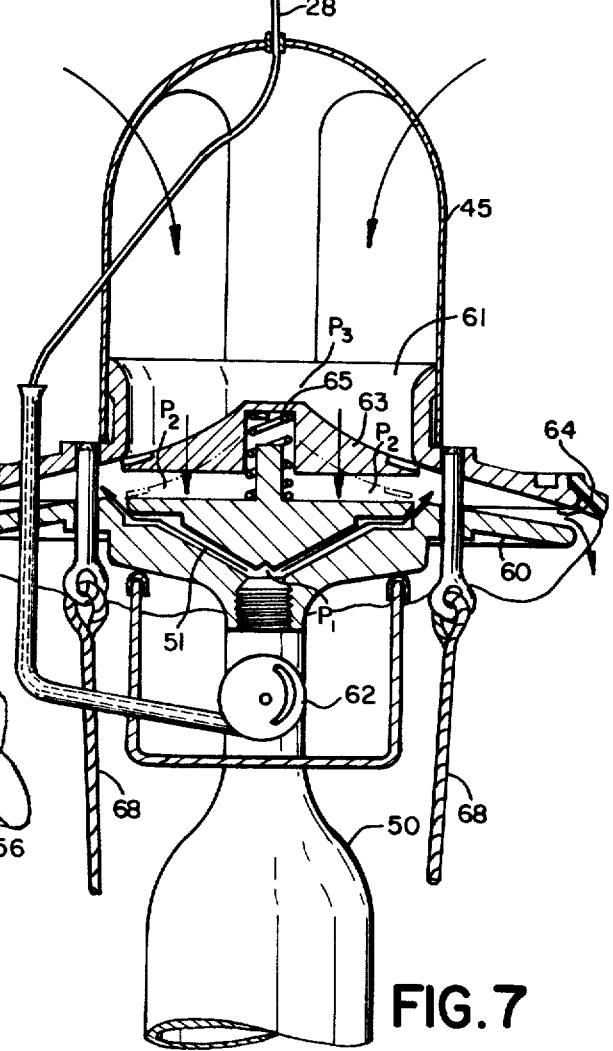
FIG. 7 is an enlarged, cross-sectional view of an inflation supply subsystem of the portion FIG. 5 along the line 6—6 thereof.

FIG. 7 more clearly illustrates that the other end of lanyard 28 is connected to a ball-type valve 62 which when activated by lanyard 28 allows air flow directly into primary discharge passages 51 of an aspirator 60 from a high pressure stored gas reservoir 50. Aspirator 60 is employed to achieve rapid deployment necessary at low altitudes and high flight speeds. Aspirator 60, valve 62 and reservoir 50 are directly connected together pneumatically and structurally to eliminate the need for any interconnecting hoses and simplify their mounting as an inflation subsystem within the sphere 54 as shown in FIG. 6. Aspirator 60 is configured with a formed steel recovery pickup point 45 attached directly to a secondary or ambient air inlet section 61. Aspirator 60 configuration provides maximum pumping efficiency with flow geometry such that adverse reactions to gas flow accelerations are eliminated within the device itself. A radial flow of gas at pressure $P_1$ through passages 51 inducts the secondary, or ambient air, portion of the inflation gas mixture at pressure $P_3$ through inlet 61. Inlet 61 is closed by means of a spring loaded poppet 63 that is opened against the force of spring 65 at initiation of inflation by the inductive effect of the mixture at pressure $P_2$ created downstream of poppet 63 by inrushing high pressure primary constituent of the inflation gas. The primary gas manifolding is oriented such that it flows radially outward in a direction essentially perpendicular to the flow direction of the incoming secondary gas. As shown in FIG. 7, poppet 63 is contoured to assist in changing the direction of the secondary flow as it is inducted by the expansion of the primary gas stream in the venturi mixing area of aspirator 60. The poppet 63 exhibits a stable, positive closure action when backflow of primary gases occurs after inflation of the device 32. The radial, omnidirectional flow pattern of gases from aspirator 60 facilitates "round-out" of device 32 previously stored in container 21 in its deflated condition. The entire inflation subsystem 50, 60, 62 may be withdrawn for recharge or maintenance from the sphere 54 by separating a six-point bridle 68 at the base of sphere 54 from a sphere-to-recovery transition fitting 72 followed by detachment of aspirator 60 from its mounting flange at the top of sphere 54. The volume of reservoir 50 is 225 cubic inches and is pressurized to 3000 psig at 70° F. containing 2 lbs of air resulting in inflation of device 32 to approximately 1 psig. About one-third of the total gas charge within device 32 comes from reservoir 50, the remaining two-thirds is inducted ambient air.

Figure 8:
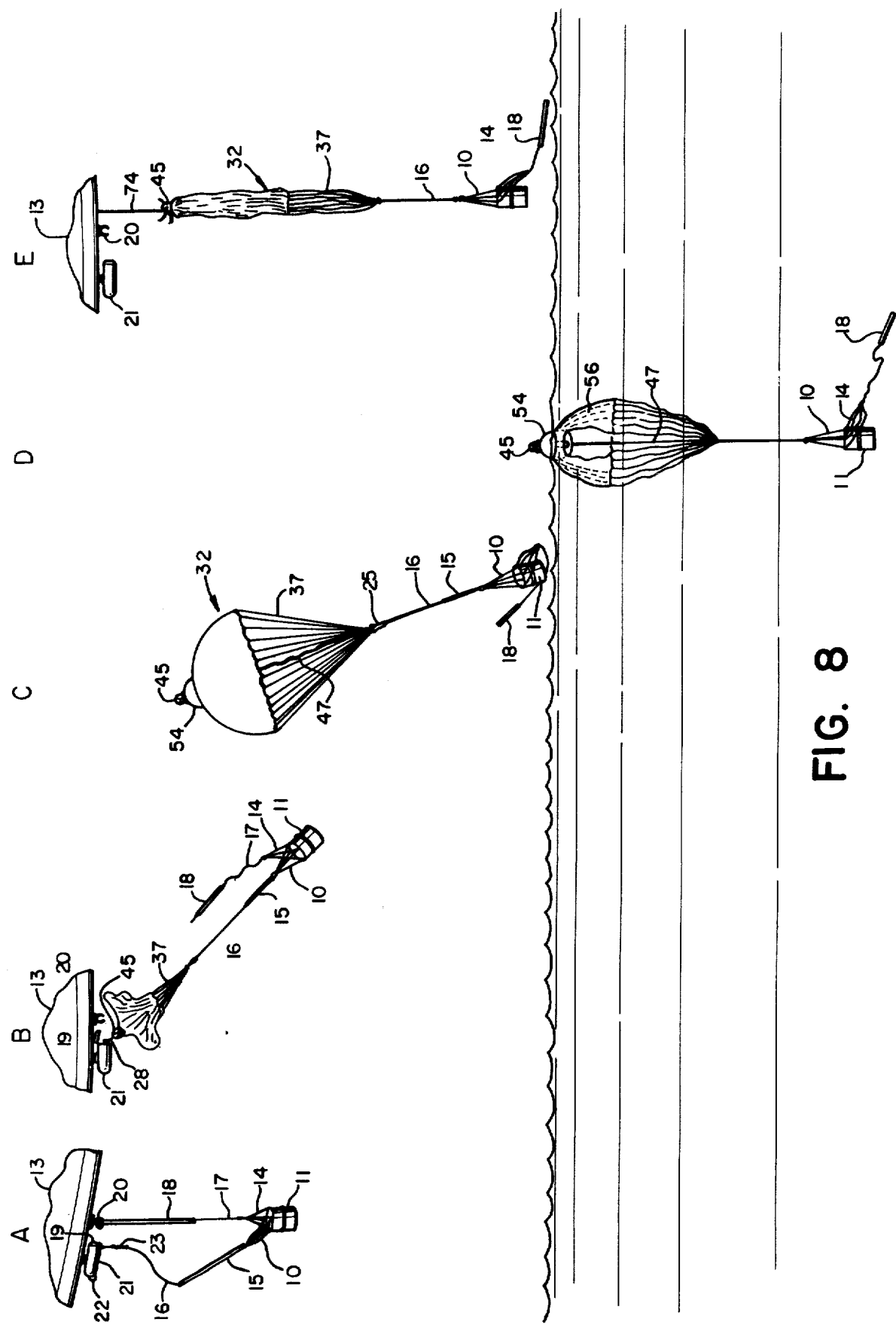
FIG. 8 is an illustration of the deployment to recovery sequence of system of this invention.

As shown in FIG. 8C when device 32 is fully deployed, it forms a conventional parachute. The inflatable sphere 54 and ribs 56 expedite canopy 58 deployment time and provides the dual capability of being a floatation device. As shown in FIG. 8D, upon water impact, the weight of cargo 11 is transferred from the shroud lines 37 and the canopy 58 to a recovery cable 47 which runs from the top portion of connector 25 to fitting 72 at the base of the sphere 54. A battery powered strobe locator light 78 having a 300,000 candlepower output and a 50 hour operting life is positioned adjacent to the recovery pickup attachment 45. The light is housed within a pocket in the sphere 54 and is activated by a gravity sensitive switch.

A description of the retardation and floatation system operation during the various operating modes as shown in FIGS. 8A–8E follows. During normal replenishment operations a cargo 11 is fitted with a device bridle 10 and connected in parallel with a support bridle 14. A helicopter 13 maneuvers into position and hoovers over the cargo 11 at which time a crewman disengages a reach tube 15 of a pendant 16 from a suspension hook 22. The crewman then engages a reach tube 18 of pendant 17 into the suspension cargo hook 20 and then engages the reach tube 15 of the raft pendant 16 into a raft bridle hook 12 to complete the cargo to helicopter hook-up and retardation and floatation system hook-up. Helicopter 13 takes off, transports the cargo 11 to its destination, hoovers over the deck of a ship, at which time a crewman grabs the reach tube 18 of the support sling 17, at which time the helicopter pilot disengages suspension hook 20 releasing sling 17. Reach tube 15 is then disengaged by a crewman from the raft bridle cargo hook 12 and is engaged into the pendant retention latch 22. Helicopter 13 is now free to return empty for additional cargo. The only additional operations require to accommodate the retardation and floatation system are those of bridle 10 attachment and detachment from reach tube 15 at times of cargo 11 transfer.

During jettison the following sequence occurs. The cargo hook release 20 is actuated by the pilot. This allows cargo to fall free from the helicopter tensioning the raft pendant 16 causing reefed section 23 to break loose its safety ties 35 and extend. Subsequent to full extension of pendant 16 the container latch release pin 24 is sheared as the weight of the cargo 11 is transferred to the parachute shroud line 37 through pendant connector 25. Subsequent to latch release the container door 19 becomes free to swing open permitting device 32 to be withdrawn from container 21. Just as the last of device 32 clears the container 21 the inflation lanyard 28 is tensioned and inflation is initiated, FIG. 8B. The system is fully deployed and functional for retardation and floatation shortly after start of inflation. Upon water impact the cargo 11 weight is transferred to recovery cable 47 which runs from the base of the floatation body center sphere 54 to the upper end of the shroud to pendant transition fitting 25. As this occurs, the spider legs 56 are buckled downward and below the surface of the water as shown in FIG. 8D. Floatation attitude of the system is such that approximately the upper third of the sphere 54 floats above the water thus maintaining the recovery pick-up attachment 45 in a readily accessible position. Strobe locator light 78 begins to flash as a result of the gravity activator switch which connects power from a self-contained power source to energize light 78. The cargo 11 is suspended under equilibrium conditions below the surface of the water. During recovery operations (FIG. 8E) the cargo is carried by recovery cable 47, through the inflatable sphere 54 (FIGS. 4 and 6) and bridle 68, to recovery pick-up attachment 45.

Some of the many advantages of the invention should now be readily apparent. For example, a novel retardation and floatation system has been provided having a conventional parachute shape and which is quickly deployed for retardation and floatation by utilization of an inflatable substructure. The system is automatically acutated by a single action initiated by an increase in relative distance of the cargo from the helicopter. Each system may become a permanent part of a particular helicopter and may be used over and over again with many different cargos. A retardation and floatation device once activated to deployment can be retrieved, recharged, and repacked into its container for future utilization. The system is independent of cargo configuration and minimizes the operations for attachment at time of cargo pick-up or drop-off. Suspensions from the helicopter provide an additional free-fall height or available time to actuate and deploy the retardation and floatation system. The floatation device provides a buoyancy margin exceeding maximum cargo weight. The system employs an aspirator to achieve rapid deployment necessary at low altitudes and high flight-speeds. Ambient air is inducted by the primary gas radial flow configuration providing a substantial portion of the total inflation gas mixture. The inflation subsystem being integrated within the retardation and floatation device has the advantage of providing a symmetrical installation having structural, aerodynamic and buoyancy stability.

Obviously, many modifications and variations of the present invention are possible in the light of the above teachings. It is therefore to be understood that, within the scope of the appended claims, the invention may be practiced otherwise than as specifically described.

What is claimed is:

1. In a cargo lift system having a support bridle, support sling, and hook for transporting externally slung cargo by an elevated platform, an improved cargo recovery apparatus comprising, in combination:
    a recovery bridle formed at one end to be connected to the cargo;
    a streamlined container closed at one end;
    pivot means connected between said ends of said container and formed to be secured to the platform for providing a 360° rotation of said container about a vetical axis therethrough to permit alignment of said other end of said container with the cargo;
    a hinged door releasably connected at said other end of said container and having a shear pin for releasably latching thereto;
    a pendant means formed at one end to be connected to said recovery bridle and at said other end having a connector through which said shear pin releasably latch said door to said container;
    uninflated parachute means deployably stowed in said container; and
    inflator means connected within said uninflated parachute means having a compressed gas reservoir for inflating said uninflated parachute means.

2. Apparatus as recited in claim 1 wherein said uninflated parachute means further comprises:
    a canopy having an inflatable sphere connected at the center of said canopy having bulkheads within, forming a central airtight compartment and having a plurality of separate airtight radial compartments with inflatable ribs communicating with said sphere and radiating therefrom for supporting said canopy;
    inflator means having a compressed gas reservoir connected within said bulkhead for inflating said sphere and ribs;
    a rigid recovery attachment means connected to said inflator means and having air ducts thereto formed to be connected to a grappling hook for cargo retrieval;
    shroud lines connected to said canopy and having a connector for supporting the cargo during free fall;
    a bridle connected within said sphere between said inflator means and through a fitting to the opposed outside of said sphere;
    a recovery cable connected between said fitting and said connector; and
    a lanyard connected between said container and said inflator means for automatically activating said inflator means when said parachute means is deployed from said container.

3. Apparatus according to claim 2 wherein said inflator means further comprises:
    valve means at the output of said reservoir for permitting gas flow therefrom and connected to said lanyard; and
    aspirator means connected inside said sphere to receive the gas from said valve means for creating a low pressure area therein inducing ambient air to mix with the gas and pass the air and gas into said sphere and ribs.

4. Apparatus according to claim 3 wherein said aspirator means further comprises:
    first passage means having a reduced area between said reservoir and said sphere and ribs for creating directly by gas flow said low pressure region therein when the gas flows therethrough; and
    poppet means responsive to a predetermined pressure differential between the ambient air and said low pressure region for permitting the ambient air to flow into said sphere and ribs.

5. In a cargo lift system having a support bridle, support sling, and hook for transporting externally slung cargo by an elevated platform, an improved cargo recovery apparatus comprising, in combination:
    a recovery bridle formed to be connected to the cargo;
    pendant means formed to be connected to said recovery bridle;

a streamlined container secured to the platform closed at one end and including a hinged door at the other end and a door retaining shear pin for releasing said door upon application of tension on said pendant means;

pivot means connected to said container and formed to be secured to the platform for providing rotation of said container about an approximate vertical axis to permit azimuthal alignment of the other end of said container with the cargo;

a canopy stored in and container and deployable therefrom having an inflatable sphere connected at the center of said canopy including bulkheads positioned within to form a central airtight compartment and separate airtight radial compartments with said ribs and valve means formed in each of said bulkheads for permitting gas to flow from said central compartment to said radial compartments, a plurality of inflatable ribs communicating with said sphere and radiating therefrom for supporting said canopy in a deployed parachute configuration, a compressed gas reservoir, a valve means at the outlet of said reservoir for permitting gas flow therefrom and an aspirator connected to receive the gas from said valve means for inducing ambient air with the gas into said sphere and ribs having a reduced area between said reservoir and said sphere and ribs for forming a low pressure region therein when the gas flows therethrough, and poppet means responsive to a predetermined pressure differential between the ambient air and said low pressure region for permitting the ambient air to flow into said sphere and ribs;

shroud lines connected to said canopy and having a connector for supporting the cargo during free fall and being slack during cargo retrieval;

recovery attachment means connected to said canopy formed to be connected to a grappling hook for cargo retrieval;

a bridle connected between said aspirator and the opposed side of said sphere;

a recovery cable for supporting cargo retrieval connected between said bridle and said connector being slack during free fall; and a lanyard connected between said container and said valve means for automatically activating said valve means when said canopy is deployed from said container.

* * * * *